Patented Apr. 16, 1929.

1,709,824

UNITED STATES PATENT OFFICE.

HORACE WALKER, OF LEEDS, ENGLAND, ASSIGNOR, BY DIRECT AND MESNE ASSIGNMENTS, OF ONE-HALF TO GILBERT HORACE WALKER, AND ONE-HALF TO MORRIS H. EPSTEIN AND ELLY MARKS, ALL OF TORONTO, CANADA.

METHOD OF MANUFACTURE OF CELLULOSE.

No Drawing.    Application filed August 12, 1926.    Serial No. 128,907.

The principal object of the invention is to reduce the cost in the production of cellulose, utilizing materials which are largely waste and may be acquired at extremely low cost.

The principal feature of the invention consists in the utilization of the fibrous structures of the family "Solanaceœ," effecting the digestion and separation of the waste matter from the fibres and simultaneously or subsequently bleaching the same.

In the production of cellulose it has been common to use wood, esparta grass and numerous pod, leaf and stem fibres but so far as I am aware it has not been proposed to obtain cellulose from the stems, leaves and roots of potatoes, tomatoes and other similar plants.

In the carrying out of the process the fibrous stems, leaves and roots are preferably placed in suitable tanks and steam is then injected into the tanks and the mass is maintained at a temperature of approximately 112° F. for approximately twelve hours.

The mass is then removed from the tanks and spread out and thoroughly exposed to the action of atmosphere for a period of approximately twelve hours. The mass is then replaced in the tanks and subjected to the action of a suitable bleaching agent such as chloride of lime while the mass is maintained at a temperature of approximately 112° F. for a further period of approximately twelve hours.

The fibrous mass may be beaten or rolled to crush the pulpy exterior materials before being treated in the tanks, if found desirable, but such treatment largely depends upon the condition of the materials at the time they are received for treatment, that is to say, if the plants are green and pulpy it may be found desirable to subject them to mechanical treatment so as to primarily separate some of the exterior coatings of the fibres.

After the secondary treatment in the digesting tanks with the chloride of lime or other form of bleaching agent the pulp is removed and thoroughly macerated by suitable beaters which will thoroughly break down the structure and separate the fibres from the waste material.

It is found that treatment of this class of materials in the manner described by a simple combined digesting and bleaching is quite effective in separating the cellulose fibres from the waste and after maceration the mass can be washed to remove the undesired waste, leaving the fibre pulp which is of a remarkably good quality and may be used alone in the production of papers or it may be blended with other suitable pulps as may be desired, or the cellulose may be utilized for any purpose for which it is employed.

In the treatment of the fibrous material it will of course be understood that suitable ingredients may be added to the mass in the digesters in order to sterilize the same against bacteriological development, or such materials may be added for the purpose of resisting oxidation of the cellulose.

It will also be understood that if a fine grade of cellulose is desired, such as is required in the production of artificial silk, the mass may be treated with caustic soda to completely separate the cellulose fibres from the undesirable materials.

From the materials herein mentioned a very excellent class of cellulose is produced and as these materials are obtainable in large quantities and are at present entirely waste matter the cost of production will be extremely low.

What I claim as my invention is:

1. In the production of cellulose, the use of stems, roots, tops, etc. of plants of the family Solanaceœ, the same being subjected to a boiling temperature for a predetermined period, then exposed to atmosphere and then bleached and digested, and finally treated to separate the cellulose from the mass.

2. A method of manufacture of cellulose, consisting in placing the leaves, stems and roots of potato plants or the like in a digester maintaining it at a temperature of approximately 112° F. by the application of steam for a period of approximately twelve hours, removing the mass and spreading it out to the action of atmosphere for a period of approximately twelve hours, then digesting the mass in a digester under the application of steam and a bleaching agent, and finally macerating the mass and separating the cellulose out of the mass.

HORACE WALKER, M. A.